United States Patent
Husain et al.

(10) Patent No.: US 12,170,466 B1
(45) Date of Patent: Dec. 17, 2024

(54) CONCENTRATED MOTOR WINDING CONFIGURATION AND METHOD OF MANUFACTURING

(71) Applicant: Amazon Technologies, Inc., Seattle, WA (US)

(72) Inventors: Tausif Husain, Maple Valley, WA (US); Rick Roller, Seattle, WA (US); Sung Ho An, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 156 days.

(21) Appl. No.: 17/834,196

(22) Filed: Jun. 7, 2022

(51) Int. Cl.
*H02K 15/04* (2006.01)
*H02K 15/06* (2006.01)

(52) U.S. Cl.
CPC ......... *H02K 15/0428* (2013.01); *H02K 15/06* (2013.01)

(58) Field of Classification Search
CPC ........................ H02K 15/0428; H02K 15/06
See application file for complete search history.

(56) References Cited

U.S. PATENT DOCUMENTS

| | | | | |
|---|---|---|---|---|
| 2002/0117928 A1* | 8/2002 | Yasuhara | .................. | H02K 3/12 310/201 |
| 2004/0119361 A1* | 6/2004 | Neet | ........................ | H02K 3/12 310/208 |
| 2004/0119362 A1* | 6/2004 | Neet | ........................ | H02K 3/24 310/201 |
| 2005/0081365 A1* | 4/2005 | Gorohata | ........... | H02K 15/0428 29/598 |
| 2005/0108870 A1* | 5/2005 | Harada | .............. | H02K 15/0414 29/606 |
| 2008/0136274 A1* | 6/2008 | Fujii | .................... | H02K 15/085 310/201 |
| 2008/0136284 A1* | 6/2008 | Fujii | ....................... | H02K 3/12 310/214 |
| 2009/0121576 A1* | 5/2009 | Even | .................... | H02K 15/066 29/596 |
| 2010/0001609 A1* | 1/2010 | Ishigami | .................. | H02K 3/12 310/202 |

(Continued)

FOREIGN PATENT DOCUMENTS

| | | | | |
|---|---|---|---|---|
| CA | 2605457 A1 | * 10/2006 | ................ | F01C 1/10 |
| CN | 111245128 A | * 6/2020 | ............. | H02K 1/148 |

(Continued)

*Primary Examiner* — Jeffrey T Carley
*Assistant Examiner* — Jose K Abraham
(74) *Attorney, Agent, or Firm* — Athorus, PLLC (57) ABSTRACT

Systems and methods to form concentrated motor windings may include bending wires into a U-shape, inserting the wires onto a stator pole, bending ends of the wires around the stator pole, and welding respective pairs of the ends of the bent wires. In some example embodiments, the U-shape may include a twist along a central portion thereof. In other example embodiments, a twist may be introduced along the respective pairs of bent ends of the wires that are then welded. In addition, the wires may be stacked and laterally inserted onto the stator pole. Further, the wire bending, twisting, insertion, welding, and other forming processes may be performed by automated or robotic machinery or equipment.

20 Claims, 8 Drawing Sheets

(56) References Cited

U.S. PATENT DOCUMENTS

| | | | | |
|---|---|---|---|---|
| 2010/0170084 | A1* | 7/2010 | Hasegawa | H02K 15/045 |
| | | | | 29/605 |
| 2015/0059174 | A1* | 3/2015 | Shigematsu | H02K 15/0428 |
| | | | | 29/755 |
| 2015/0180296 | A1* | 6/2015 | Ravaud | H02K 5/12 |
| | | | | 310/85 |
| 2015/0256052 | A1* | 9/2015 | Yoshida | H02K 9/223 |
| | | | | 29/598 |
| 2018/0025831 | A1* | 1/2018 | Sasaki | H01F 27/29 |
| | | | | 336/221 |
| 2019/0222087 | A1* | 7/2019 | Matsumoto | H02K 15/064 |
| 2020/0220411 | A1* | 7/2020 | Kim | H02K 3/50 |
| 2020/0358343 | A1* | 11/2020 | Lee | H02K 15/06 |
| 2022/0255386 | A1* | 8/2022 | Hijikata | H02K 3/12 |
| 2022/0294283 | A1* | 9/2022 | Hijikata | H02K 3/12 |
| 2023/0051080 | A1* | 2/2023 | Huang | H02K 15/066 |

FOREIGN PATENT DOCUMENTS

| | | | | | |
|---|---|---|---|---|---|
| DE | 102009055325 | A1 | * | 6/2011 | ......... H02K 15/0075 |
| DE | 112012006894 | T5 | * | 6/2015 | ......... H02K 15/0081 |
| JP | 3284981 | B2 | * | 5/2002 | ......... H02K 15/0428 |
| JP | 2003274594 | A | * | 9/2003 | |
| JP | 2006050853 | A | * | 2/2006 | |
| JP | 2021069182 | A | * | 4/2021 | |

* cited by examiner

CONCENTRATED MOTOR WINDING CONFIGURATION AND METHOD OF MANUFACTURING

BACKGROUND

Unmanned aerial vehicles ("UAV") are continuing to increase in use. For example, UAVs may often utilize motors having concentrated motor windings. However, conventional configurations and methods of manufacturing concentrated motor windings may be slow and expensive, or may be fast and inefficient with respect to winding density. Accordingly, there is a need for systems and methods to manufacture concentrated motor windings using faster and more efficient processes, while also increasing winding density and providing improved electromagnetic and thermal performance of such motors.

DETAILED DESCRIPTION

As is set forth in greater detail below, implementations of the present disclosure are directed to systems and methods to form or manufacture concentrated motor windings using preformed U-shaped wires. In example embodiments, the concentrated motor winding configurations described herein may be formed or manufactured using a limited set of preformed U-shaped wires, e.g., one U-shaped wire having a defined shape, size, and/or length and one or more straight wires, or two U-shaped wires having different defined shapes, sizes, and/or lengths.

In an example embodiment, a first wire, a first set of wires, or a first plurality of wires may be formed in a U-shape. For example, the U-shape may include a substantially straight central portion, and two substantially straight end portions that extend from respective ends of the substantially straight central portion. In addition, the first plurality of wires may be twisted along the substantially straight central portion, as further described herein. Further, a second wire, a second set of wires, or a second plurality of wires may be substantially straight wires. Then, the first plurality of wires and the second plurality of wires may be inserted onto a stator pole, and respective ends of the first and second plurality of wires may be bent around the stator pole. Thereafter, respective pairs of the respective ends of the first and second plurality of wires may be welded together to form the concentrated motor windings.

In another example embodiment, a first wire, a first set of wires, or a first plurality of wires may be formed in a first U-shape. For example, the first U-shape may include a substantially straight first central portion, and two substantially straight first end portions that extend from respective ends of the substantially straight first central portion. In addition, a second wire, a second set of wires, or a second plurality of wires may be formed in a second U-shape. For example, the second U-shape may include a substantially straight second central portion, and two substantially straight second end portions that extend from respective ends of the substantially straight second central portion. Then, the first plurality of wires and the second plurality of wires may be inserted onto a stator pole, and respective ends of the first and second plurality of wires may be bent around the stator pole. Further, the respective ends of the first and second plurality of wires may be twisted along the stator pole, as further described herein. Thereafter, respective pairs of the respective ends of the first and second plurality of wires may be welded together to form the concentrated motor windings.

Using the systems and methods described herein, concentrated motor winding configurations may be formed using a limited set of preformed U-shaped wires, e.g., one U-shaped wire having a defined shape, size, and/or length and one or more straight wires, or two U-shaped wires having different defined shapes, sizes, and/or lengths. In addition, the concentrated motor winding configurations may be formed using automated or robotic wire formers, die forming tools, compression dies, insertion tools, welding equipment, or other types of machinery or equipment. Furthermore, the concentrated motor winding configurations may be formed by lateral insertion of U-shaped wires onto stator poles, as opposed to conventional radial winding processes that may require additional space or clearance during manufacturing.

As a result, the systems and methods described herein may form or manufacture concentrated motor windings using preformed U-shaped wires in a faster and more efficient manner than conventional manufacturing methods, while also reducing complexity as compared to conventional manufacturing processes that may utilize more than two, e.g., five, ten, or more, different types of preformed wires to form distributed motor windings.

Generally, motor winding configurations may include concentrated windings and distributed windings. Concentrated windings, on the one hand, are generally wound around a single stator tooth or pole, either manually or by a winding machine. Distributed windings, on the other hand, are generally wound around two or more stator teeth or poles, and although some hairpin wires have been utilized for distributed windings, such manufacturing processes require many, e.g., more than two, different hairpin wire shapes that may extend over or around different numbers of stator teeth or poles. Furthermore, motor winding configurations may also be referred to in terms of lap windings, which may include simplex, duplex, or other types of lap windings, and/or wave windings, which may include progressive or retrogressive types of wave windings. Various other types of motor winding configurations are also possible. In addition, conventional manufacturing processes for concentrated motor windings may achieve a winding density of approximately 30-40%, e.g., measured in terms of copper fill per slot area. In contrast, the manufacturing processes for concentrated motor winding configurations described herein may achieve a winding density of approximately 70% or greater, e.g., measured in terms of copper fill per slot area.

Figure 1:
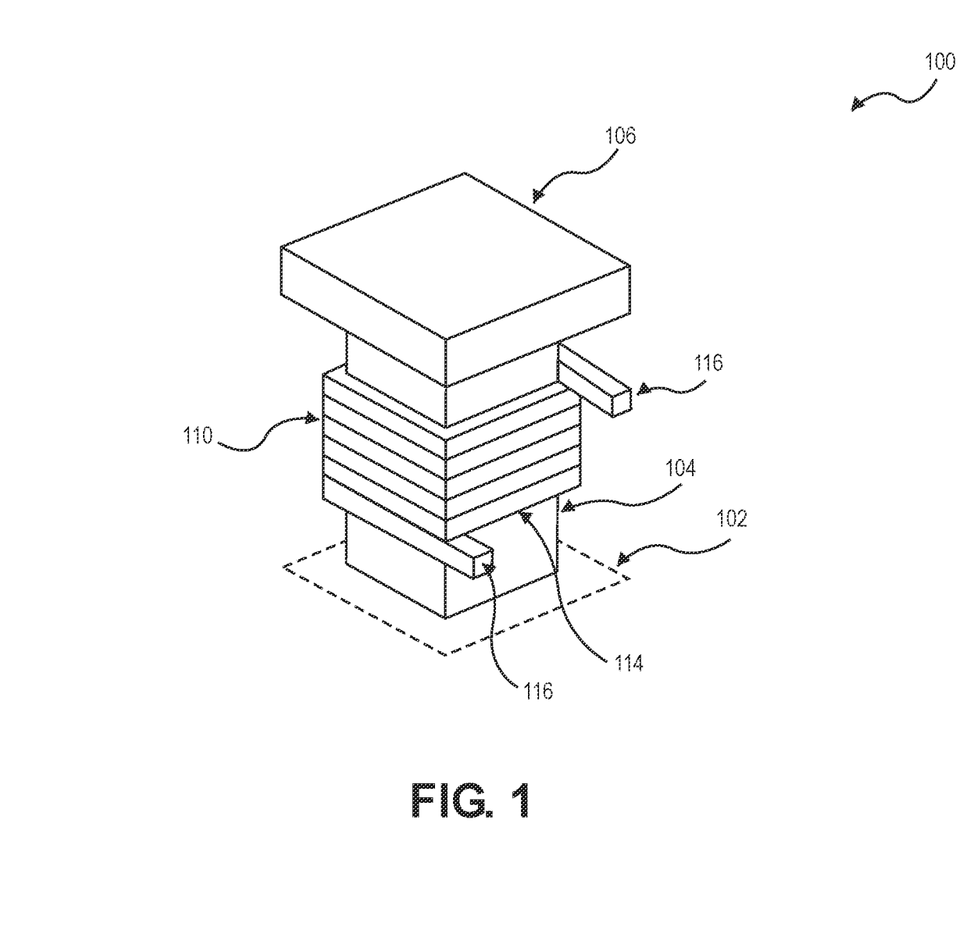
FIG. 1 is a schematic, perspective view diagram of an example concentrated motor winding configuration, in accordance with implementations of the present disclosure.

FIG. 1 is a schematic, perspective view diagram 100 of an example concentrated motor winding configuration, in accordance with implementations of the present disclosure.

In example embodiments, the systems and methods described herein include improved configurations of and methods for manufacturing concentrated motor windings using preformed U-shaped wires, e.g., one or two U-shaped wire shapes, sizes, and/or lengths. For example, the concentrated motor windings described herein may be used to manufacture various types of electric machines or motors having a "q" value that is less than one, in which:

$$q = Ns/P/\text{Phase},$$

where Ns refers to a number of slots of the electric machine, P refers to a number of poles of the electric machine, and Phase refers to a number of phases of the electric machine.

In addition, the concentrated motor windings described herein may be used to manufacture various types of electric machines or motors, such as radial flux electric machines, axial flux electric machines, or transverse flux electric machines.

Generally, radial flux electric machines may be defined by a direction of rotation and a direction of flux in core that are parallel, and a direction of air gap (e.g., a radial air gap) that is orthogonal to the directions of rotation and of flux in core. Further, radial flux electric machines may generally include stator poles having stator pole axes that extend substantially radially inward or outward relative to rotational axes of the electric machines.

In addition, axial flux electric machines may be defined by a direction of rotation and a direction of flux in core that are also parallel, and a direction of air gap (e.g., an axial air gap) that is orthogonal to the directions of rotation and of flux in core. Further, axial flux electric machines may generally include stator poles having stator pole axes that extend substantially parallel to rotational axes of the electric machines.

Moreover, transverse flux electric machines may be defined by a direction of rotation, a direction of flux in core, and a direction of air gap (e.g., an axial air gap) that are each orthogonal to each other.

As shown in FIG. 1, a portion of an electric machine or motor is illustrated including a portion of a stator 102, a stator tooth or pole 104 having a stator pole axis that extends centrally along the stator pole 104, and a pole shoe 106. In addition, a concentrated motor winding 110 may be formed or manufactured around the pole 104, including a plurality of windings 114 and respective free ends 116 of the windings 114 that may later form electrical connections of the electric machine.

As further described herein, the plurality of windings 114 may be formed using one or two preformed U-shaped wires, and/or one or more straight wires, that are bent and/or twisted and then laterally inserted onto or around the pole 104. In addition, ends of the inserted wires may be bent and/or twisted around the pole 104. Then, respective pairs of the ends of the inserted wires may be welded together to form the concentrated motor winding 110.

Although FIG. 1 illustrates a particular size, shape, configuration, or arrangement of portions of a concentrated motor winding configuration, other example embodiments may include other sizes, shapes, configurations, or arrangements of portions of the concentrated motor winding configuration. For example, the stator may have other sizes or shapes, the tooth or pole may have other sizes or shapes, the pole shoe may have other sizes or shapes, the concentrated motor winding may include other sizes, shapes, or numbers of the plurality of windings, and/or various other modifications may be made to portions of the concentrated motor winding configuration.

Figure 2A:
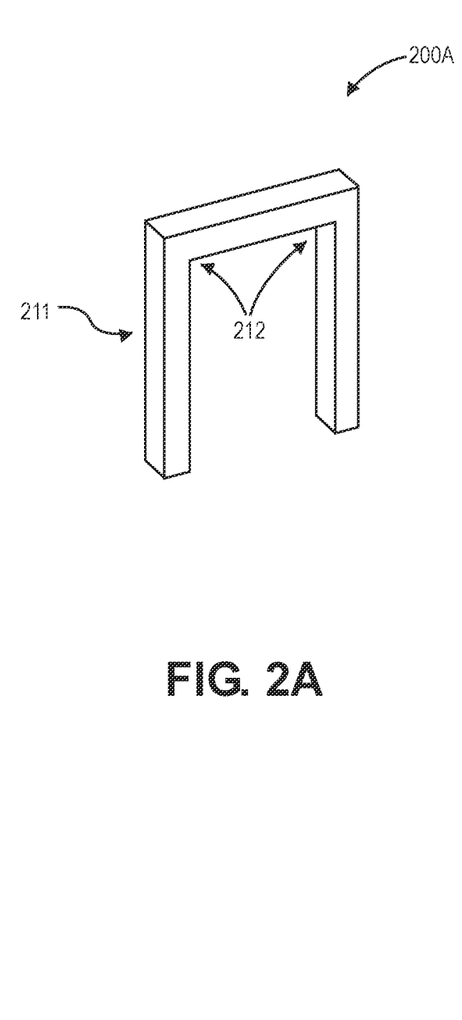
FIGS. 2A-2B are schematic, perspective view diagrams of example U-shaped wires to form a concentrated motor winding configuration, in accordance with implementations of the present disclosure.
Figure 2B:
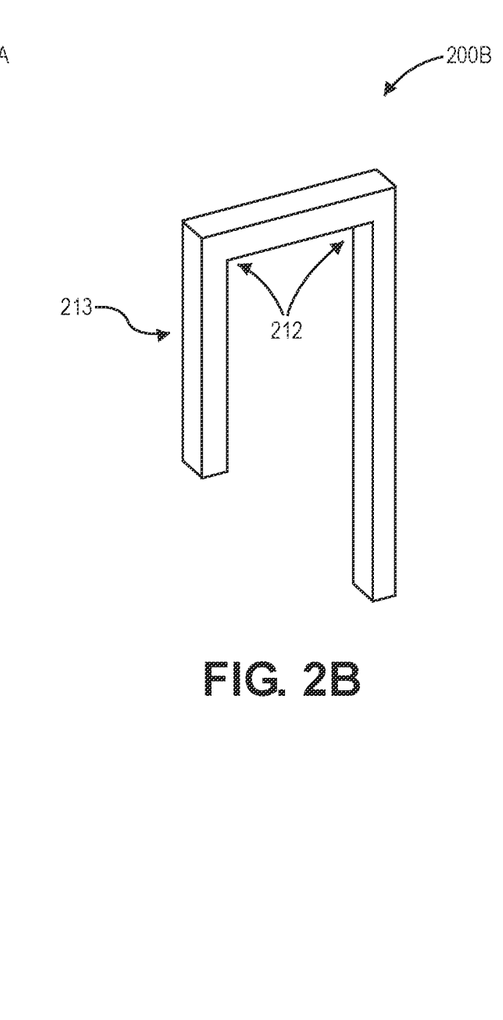

FIGS. 2A-2B are schematic, perspective view diagrams 200A, 200B of example U-shaped wires to form a concentrated motor winding configuration, in accordance with implementations of the present disclosure.

As shown in FIG. 2A, an example U-shaped wire 211 may comprise bends 212 such that the U-shaped wire 211 has a substantially U-shaped structure. For example, the U-shaped wire 211 may be formed into the U-shaped structure using automated or robotic wire formers, such as CNC (computer numerical control) wire formers or other types of machinery or equipment. In other example embodiments, the U-shaped wire 211 may be formed into the U-shaped structure using manual forming tools, processes, or methods.

The example U-shaped wire 211 may comprise a substantially square or rectangular cross-sectional shape. In addition, the U-shaped wire 211 may be formed of copper, aluminum, bundled litz wire, or other types of wire materials. Further, the U-shaped wire 211 may include insulation or coating material along an outer surface thereof, such as polyamide, polyester, polyetheretherketone (PEEK), or other types of insulation materials. Other example embodiments of the U-shaped wire 211 may include other cross-sectional shapes, e.g., round, oval, other polygonal, or other cross-sectional shapes, as well as other types of wire materials and/or insulation materials.

As illustrated in FIG. 2A, the example U-shaped wire 211 may generally be formed to include a substantially straight central portion between the bends 212, as well as two substantially straight end portions that extend from respective ends of the substantially straight central portion, e.g., that extend from the bends 212 at an angle from the substantially straight central portion. In addition, the substantially straight central portion may have a defined first length and the two substantially straight end portions may have a defined second length. For example, the first and second lengths may be defined based on associated dimensions of a stator tooth or pole onto which the U-shaped wire 211 is to be inserted, bent, and formed.

Moreover, the bends 212 of the U-shaped wire 211 may form an approximately ninety degree angle between the substantially straight central portion and a respective substantially straight end portion. Further, the bends 212 may include a radius of curvature that may generally be larger than a cross-sectional radius of the wire material. Likewise, the angle and radius of curvature of the bends 212 of the U-shaped wire 211 may be defined based on associated dimensions of a stator tooth or pole onto which the U-shaped wire 211 is to be inserted, bent, and formed.

As shown in FIG. 2B, a second example U-shaped wire 213 may also comprise bends 212 such that the U-shaped wire 213 has a substantially U-shaped structure. For example, the second U-shaped wire 213 may be formed into the U-shaped structure using automated or robotic wire formers, such as CNC (computer numerical control) wire formers or other types of machinery or equipment. In other example embodiments, the second U-shaped wire 213 may be formed into the U-shaped structure using manual forming tools, processes, or methods.

The second example U-shaped wire 213 may comprise a substantially square or rectangular cross-sectional shape. In addition, the second U-shaped wire 213 may be formed of copper, aluminum, bundled litz wire, or other types of wire materials. Further, the second U-shaped wire 213 may include insulation or coating material along an outer surface thereof, such as polyamide, polyester, polyetheretherketone (PEEK), or other types of insulation materials. Other example embodiments of the second U-shaped wire 213 may include other cross-sectional shapes, e.g., round, oval, other polygonal, or other cross-sectional shapes, as well as other types of wire materials and/or insulation materials.

As illustrated in FIG. 2B, the second example U-shaped wire 213 may generally be formed to include a substantially straight central portion between the bends 212, as well as two substantially straight end portions that extend from respective ends of the substantially straight central portion, e.g., that extend from the bends 212 at an angle from the substantially straight central portion. In addition, the substantially straight central portion of the second U-shaped wire 213 may have a defined first length, which may be substantially similar to the defined first length of the substantially straight central portion of the U-shaped wire 211. Further, one of the two substantially straight end portions of the second U-shaped wire 213 may have a defined second length, which may be substantially similar to the defined second length of the two substantially straight end portions of the U-shaped wire 211. Furthermore, another of the two substantially straight end portions of the second U-shaped wire 213 may have a defined third length that is different than the defined second length, e.g., longer than the defined second length, in order to form a free end 116 of a concentrated winding 110. For example, the first, second, and third lengths may be defined based on associated dimensions of a stator tooth or pole 104 onto which the second U-shaped wire 213 is to be inserted, bent, and formed.

Moreover, the bends 212 of the second U-shaped wire 213 may form an approximately ninety degree angle between the substantially straight central portion and a respective substantially straight end portion. Further, the bends 212 may include a radius of curvature that may generally be larger than a cross-sectional radius of the wire material. Likewise, the angle and radius of curvature of the bends 212 of the second U-shaped wire 213 may be defined based on associated dimensions of a stator tooth or pole onto which the second U-shaped wire 213 is to be inserted, bent, and formed.

Although FIGS. 2A and 2B illustrate a particular size, shape, configuration, or arrangement of portions of example U-shaped wires, other example embodiments may include other sizes, shapes, configurations, or arrangements of portions of the example U-shaped wires. For example, the wires may have different sizes, shapes, or cross-sectional shapes, the central portion and/or end portions may have different defined lengths, the bends may have different angles or radii of curvature, and/or various other modifications may be made to portions of the example U-shaped wires.

Figure 3A:
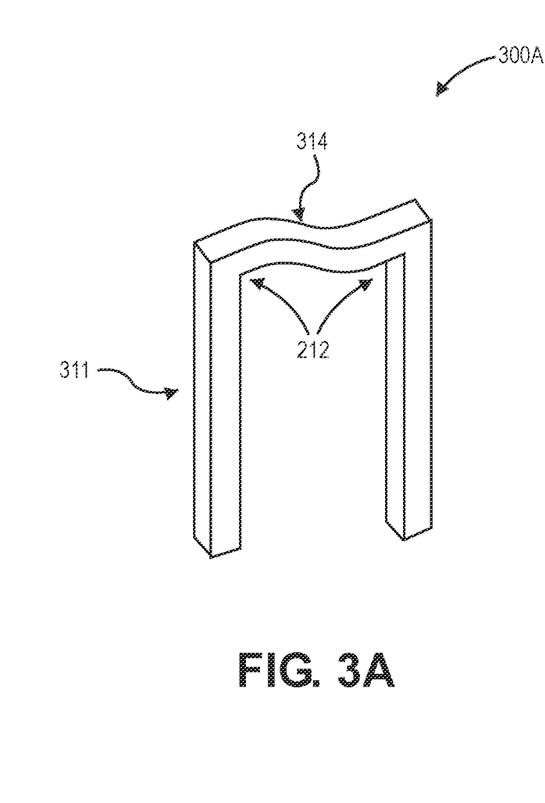
FIGS. 3A-3B are schematic, perspective view diagrams of additional example U-shaped wires and straight wires to form a concentrated motor winding configuration, in accordance with implementations of the present disclosure.
Figure 3B:
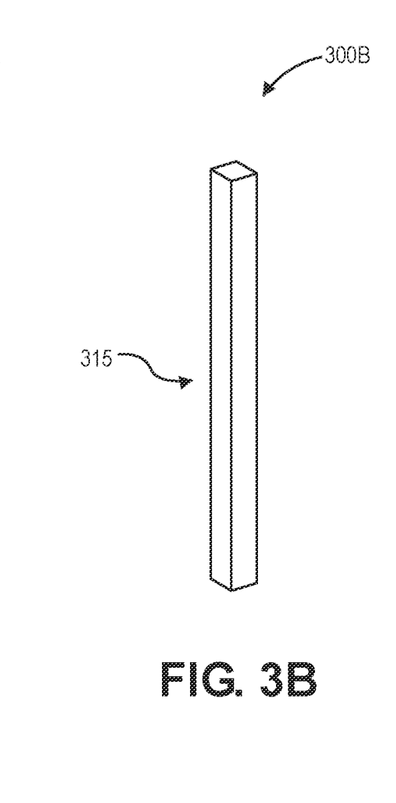

FIGS. 3A-3B are schematic, perspective view diagrams 300A, 300B of additional example U-shaped wires and straight wires to form a concentrated motor winding configuration, in accordance with implementations of the present disclosure.

As shown in FIG. 3A, another example U-shaped wire 311 may comprise bends 212 such that the U-shaped wire 311 has a substantially U-shaped structure. For example, the U-shaped wire 311 may be formed into the U-shaped structure using automated or robotic wire formers, such as CNC (computer numerical control) wire formers or other types of machinery or equipment. In other example embodiments, the U-shaped wire 311 may be formed into the U-shaped structure using manual forming tools, processes, or methods.

The example U-shaped wire 311 may comprise a substantially square or rectangular cross-sectional shape. In addition, the U-shaped wire 311 may be formed of copper, aluminum, bundled litz wire, or other types of wire materials. Further, the U-shaped wire 311 may include insulation or coating material along an outer surface thereof, such as polyamide, polyester, polyetheretherketone (PEEK), or other types of insulation materials. Other example embodiments of the U-shaped wire 311 may include other cross-sectional shapes, e.g., round, oval, other polygonal, or other cross-sectional shapes, as well as other types of wire materials and/or insulation materials.

Similar to the description with respect to FIG. 2A, the example U-shaped wire 311 may initially be formed to include a substantially straight central portion between the bends 212, as well as two substantially straight end portions that extend from respective ends of the substantially straight central portion, e.g., that extend from the bends 212 at an angle from the substantially straight central portion. In addition, the substantially straight central portion may have a defined first length and the two substantially straight end portions may have a defined second length. For example, the first and second lengths may be defined based on associated dimensions of a stator tooth or pole onto which the U-shaped wire 311 is to be inserted, bent, and formed.

Moreover, the bends 212 of the U-shaped wire 311 may form an approximately ninety degree angle between the substantially straight central portion and a respective substantially straight end portion. Further, the bends 212 may include a radius of curvature that may generally be larger than a cross-sectional radius of the wire material. Likewise, the angle and radius of curvature of the bends 212 of the U-shaped wire 311 may be defined based on associated dimensions of a stator tooth or pole onto which the U-shaped wire 311 is to be inserted, bent, and formed.

As illustrated in FIG. 3A, the example U-shaped wire 311 may be further formed, bent, twisted, or molded to include a twist 314 along the substantially straight central portion between the bends 212. The twist 314 may be formed such that one substantially straight end portion and adjacent section of the substantially straight central portion may be positioned in a first plane along an axis of a stator pole, and the other substantially straight end portion and adjacent section of the substantially straight central portion may be positioned in a second plane along an axis of a stator pole. In addition, the first plane and the second plane may be substantially adjacent each other along an axis of a stator pole, such that multiple U-shaped wires 311 having associated twists 314 may be stacked on top of each other, as further described herein.

In example embodiments, the twist 314 of the U-shaped wire 311 may be formed using automated or robotic compression dies, die forming tools, or other types of machinery or equipment. In other example embodiments, the twist 314 of the U-shaped wire 311 may be formed using manual forming tools, processes, or methods.

As shown in FIG. 3B, an example straight wire 315 may comprise a column-shaped structure that does not include any bends. For example, the straight wire 315 may be formed into the column-shaped structure using automated or robotic wire formers, such as CNC (computer numerical control) wire formers or other types of machinery or equipment. In other example embodiments, the straight wire 315 may be formed into the column-shaped structure using manual forming tools, processes, or methods.

The straight wire 315 may comprise a substantially square or rectangular cross-sectional shape. In addition, the straight wire 315 may be formed of copper, aluminum, bundled litz wire, or other types of wire materials. Further, the straight wire 315 may include insulation or coating material along an outer surface thereof, such as polyamide, polyester, polyetheretherketone (PEEK), or other types of insulation materials. Other example embodiments of the straight wire 315 may include other cross-sectional shapes, e.g., round, oval, other polygonal, or other cross-sectional shapes, as well as other types of wire materials and/or insulation materials.

As illustrated in FIG. 3B, the straight wire 315 may generally be formed to include a column-shaped structure without any bends. In addition, the straight wire 315 may have a defined length, which may be substantially similar to the defined third length of the other of the two substantially straight end portions of the second U-shaped wire 213, e.g., in order to form a free end 116 of a concentrated winding. For example, the length of the straight wire 315 may be defined based on associated dimensions of a stator tooth or pole onto which the straight wire 315 is to be inserted, bent, and formed.

Although FIGS. 3A and 3B illustrate a particular size, shape, configuration, or arrangement of portions of example U-shaped wires and straight wires, other example embodiments may include other sizes, shapes, configurations, or arrangements of portions of the example U-shaped wires and straight wires. For example, the wires may have different sizes, shapes, or cross-sectional shapes, the central portion and/or end portions may have different defined lengths, the bends may have different angles or radii of curvature, and/or various other modifications may be made to portions of the example U-shaped wires and straight wires.

Figure 4A:
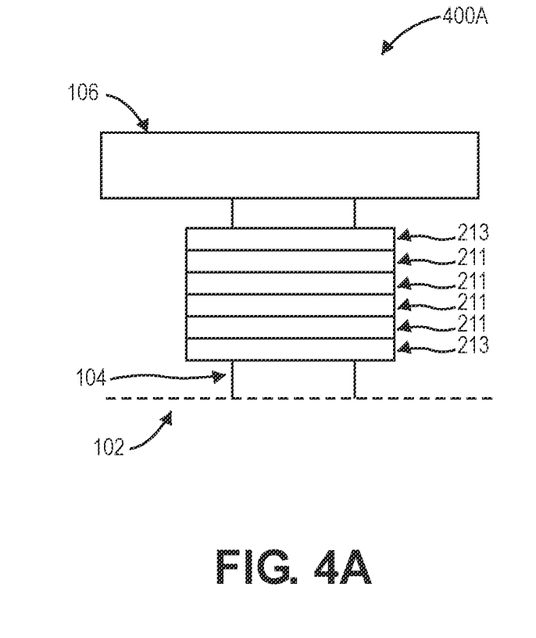
FIGS. 4A-4B are schematic, side view diagrams of an example concentrated motor winding configuration manufactured using example U-shaped wires, in accordance with implementations of the present disclosure.
Figure 4B:
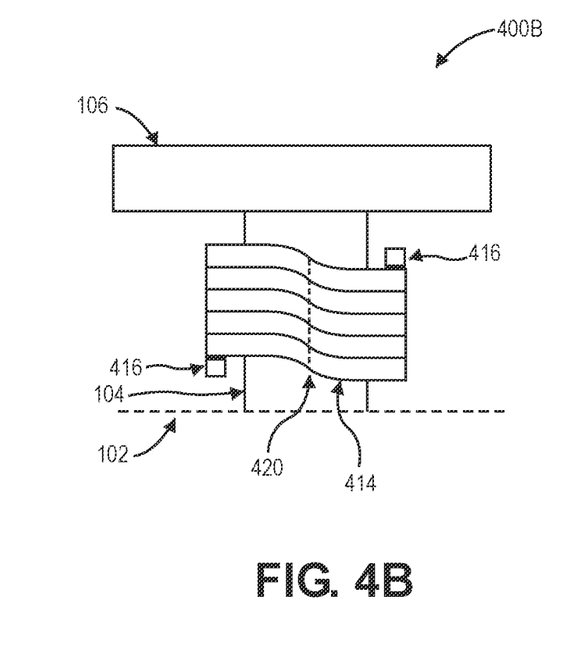

FIGS. 4A-4B are schematic, side view diagrams 400A, 400B of an example concentrated motor winding configuration manufactured using example U-shaped wires, in accordance with implementations of the present disclosure.

As shown in FIGS. 4A and 4B, an example concentrated motor winding configuration may be formed or manufactured using the example U-shaped wires 211, 213 described herein at least with respect to FIGS. 2A and 2B. FIG. 4A illustrates a first lateral side of a stator 102, stator tooth or pole 104 having a stator pole axis that extends centrally along the stator pole 104 (and vertically along the page of FIG. 4A), and pole shoe 106, e.g., an insertion side, and FIG. 4B illustrates a second, opposite lateral side of the stator 102, stator tooth or pole 104 having a stator pole axis that extends centrally along the stator pole 104 (and vertically along the page of FIG. 4B), and pole shoe 106, e.g., a bending, twisting, and welding side.

For example, as shown in FIG. 4A, a plurality of first U-shaped wires 211 may be stacked on top of each other. In addition, a second U-shaped wire 213 may be positioned at a bottom of the stack, and another second U-shaped wire 213 may be positioned at a top of the stack of the plurality of first U-shaped wires 211. Then, the stacked first and second U-shaped wires 211, 213 may be inserted onto a stator tooth or pole 104 between the stator 102 and the pole shoe 106. The first and second U-shaped wires 211, 213 may be inserted substantially laterally onto the stator pole 104, e.g., from a lateral side of the stator pole 104 and radially toward the stator pole axis of the stator pole 104. This is in contrast to conventional concentrated winding processes that may wind wires radially over and around the pole shoe 106, which may thus limit the size of a pole shoe 106 in order to enable such conventional concentrated winding processes.

The stacked first and second U-shaped wires 211, 213 may be inserted using automated or robotic insertion tools, dies, or other types of machinery or equipment. In other example embodiments, the stacked first and second U-shaped wires 211, 213 may be inserted using manual insertion tools, processes, or methods.

Then, as shown in FIG. 4B, respective ends of the stacked first and second U-shaped wires 211, 213 may be bent toward each other around the stator pole 104, with the exception of respective ones of the substantially straight end portions of the second U-shaped wires 213 that may form the free ends 416 for later electrical connections of the electric machine.

The respective ends of the stacked first and second U-shaped wires 211, 213 may be bent using automated or robotic forming tools, dies, or other types of machinery or equipment. In other example embodiments, the respective ends of the stacked first and second U-shaped wires 211, 213 may be bent using manual forming tools, processes, or methods.

In addition, as shown in FIG. 4B, respective ends of the stacked first and second U-shaped wires 211, 213 may be formed, bent, twisted, or molded to include a twist 414 as the respective ends bend toward each other around the stator pole 104. The twist 414 may be formed such that one substantially straight end portion of a U-shaped wire in a first plane along the stator pole axis may bend and twist to meet or contact another substantially straight end portion of another U-shaped wire in a second plane along the stator pole axis. In addition, the first plane and the second plane may be substantially adjacent each other along the stator pole axis, such that multiple U-shaped wires may be bent and formed to include associated twists 414 and subsequently connect to each other.

In example embodiments, the twist 414 of the U-shaped wires 211, 213 may be formed using automated or robotic compression dies, die forming tools, or other types of machinery or equipment. In other example embodiments, the twist 414 of the U-shaped wires 211, 213 may be formed using manual forming tools, processes, or methods.

Further, as shown in FIG. 4B, respective pairs of the respective ends of the U-shaped wires 211, 213 that have been bent and twisted to meet or contact each other may then be welded 420 together. In addition, in order to weld the respective pairs of the respective ends of the U-shaped wires 211, 213, a portion of the insulation or coating materials of the respective ends of the U-shaped wires 211, 213 may be stripped or removed to enable welding of the respective pairs of wires. As a result, the stacked first and second U-shaped wires 211, 213 may form a substantially continuous concentrated winding that is wrapped around the stator pole 104, e.g., starting from a first free end 416, wrapping around the stator pole 104 one or more times, and then ultimately ending at a second free end 416.

In example embodiments, the welding 420 of respective pairs of the respective ends of the U-shaped wires 211, 213 may be performed using automated or robotic laser or plasma welding processes, machinery, or equipment. In other example embodiments, the welding 420 of respective pairs of the respective ends of the U-shaped wires 211, 213 may be performed using manual welding tools, processes, or methods.

Using the systems and methods described herein, a concentrated motor winding configuration may be formed or manufactured using two types of U-shaped wires, in which the two types of U-shaped wires have substantially similar shapes, lengths, bends, angles, or other dimensions. In some example embodiments, one of the two types of U-shaped wires may have elongated end portions to form free ends for later electrical connection of an electrical machine.

However, in other example embodiments, all U-shaped wires may have substantially the same shapes, lengths, bends, angles, or other dimensions, including end portions all having a same length, such that only a single type of U-shaped wire may be used to form or manufacture a concentrated motor winding configuration.

Although FIGS. 4A and 4B illustrate a particular size, shape, configuration, or arrangement of portions of an example concentrated motor winding configuration, other example embodiments may include other sizes, shapes, configurations, or arrangements of portions of the example concentrated motor winding configuration. For example, the wires may have different sizes, shapes, or cross-sectional shapes, a different number of wires may be included, and/or various other modifications may be made to portions of the example concentrated motor winding configuration.

Figure 5A:
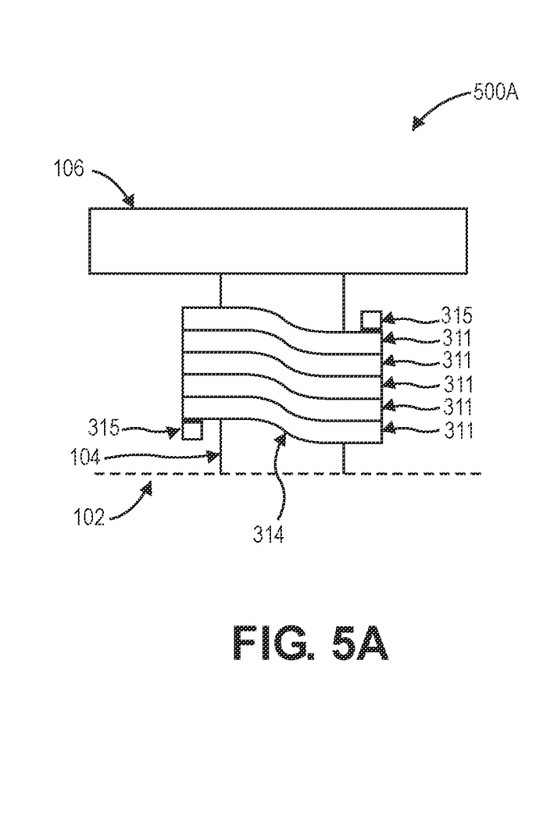
FIGS. 5A-5B are schematic, side view diagrams of another example concentrated motor winding configuration manufactured using example U-shaped wires and straight wires, in accordance with implementations of the present disclosure.
Figure 5B:
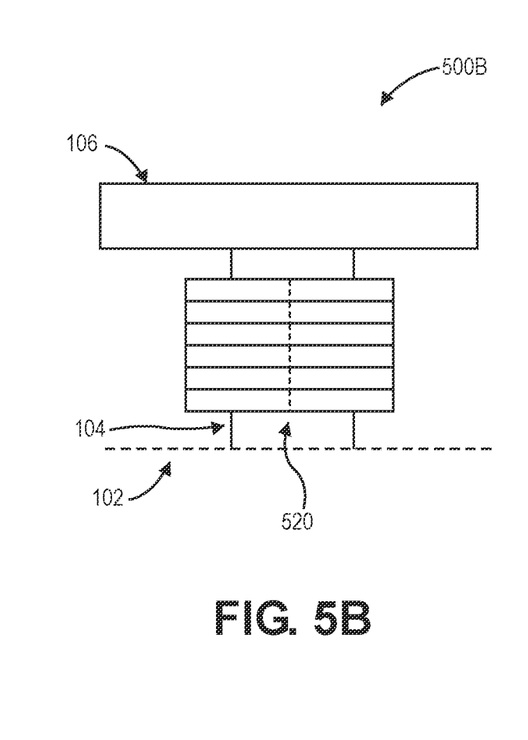

FIGS. 5A-5B are schematic, side view diagrams 500A, 500B of another example concentrated motor winding configuration manufactured using example U-shaped wires and straight wires, in accordance with implementations of the present disclosure.

As shown in FIGS. 5A and 5B, an example concentrated motor winding configuration may be formed or manufactured using the example U-shaped wires 311 and example straight wires 315 described herein at least with respect to FIGS. 3A and 3B. FIG. 5A illustrates a first lateral side of a stator 102, stator tooth or pole 104 having a stator pole axis that extends centrally along the stator pole 104 (and vertically along the page of FIG. 5A), and pole shoe 106, e.g., an insertion side, and FIG. 5B illustrates a second, opposite lateral side of the stator 102, stator tooth or pole 104 having a stator pole axis that extends centrally along the stator pole 104 (and vertically along the page of FIG. 5B), and pole shoe 106, e.g., a bending and welding side.

For example, as shown in FIG. 5A, a plurality of first U-shaped wires 311 may be stacked on top of each other, with respective twists 314 of the first U-shaped wires 311 substantially aligned and stacked on top of each other. In addition, a second straight wire 315 may be positioned at a bottom of the stack, and another second straight wire 315 may be positioned at a top of the stack of the plurality of first U-shaped wires 311. Respective ends of the second straight wires 315 may form free ends for later electrical connections of the electric machine.

Then, the stacked first and second wires 311, 315 may be inserted onto a stator tooth or pole 104 between the stator 102 and the pole shoe 106. The first and second wires 311, 315 may be inserted substantially laterally onto the stator pole 104, e.g., from a lateral side of the stator pole 104 and radially toward the stator pole axis of the stator pole 104. This is in contrast to conventional concentrated winding processes that may wind wires radially over and around the pole shoe 106, which may thus limit the size of a pole shoe 106 in order to enable such conventional concentrated winding processes.

The stacked first and second wires 311, 315 may be inserted using automated or robotic insertion tools, dies, or other types of machinery or equipment. In other example embodiments, the stacked first and second wires 311, 315 may be inserted using manual insertion tools, processes, or methods.

Then, as shown in FIG. 5B, respective ends of the stacked first and second wires 311, 315 may be bent toward each other around the stator pole 104. The respective ends of the stacked first and second wires 311, 315 may be bent using automated or robotic forming tools, dies, or other types of machinery or equipment. In other example embodiments, the respective ends of the stacked first and second wires 311, 315 may be bent using manual forming tools, processes, or methods.

Further, as shown in FIG. 5B, respective pairs of the respective ends of the wires 311, 315 that have been bent to meet or contact each other may then be welded 520 together. In addition, in order to weld the respective pairs of the respective ends of the wires 311, 315, a portion of the insulation or coating materials of the respective ends of the wires 311, 315 may be stripped or removed to enable welding of the respective pairs of wires. As a result, the stacked first and second wires 311, 315 may form a substantially continuous concentrated winding that is wrapped around the stator pole 104, e.g., starting from a first free end, wrapping around the stator pole 104 one or more times, and then ultimately ending at a second free end.

In example embodiments, the welding 520 of respective pairs of the respective ends of the wires 311, 315 may be performed using automated or robotic laser or plasma welding processes, machinery, or equipment. In other example embodiments, the welding 520 of respective pairs of the respective ends of the wires 311, 315 may be performed using manual welding tools, processes, or methods.

Using the systems and methods described herein, a concentrated motor winding configuration may be formed or manufactured using a single type of U-shaped wire having a defined shape, length, bends, angles, or other dimensions, as well as a defined twist formed or molded into a portion of the U-shaped wire. In addition, one or more straight wires may be used to form free ends for later electrical connection of an electrical machine.

However, in other example embodiments, one or more straight wires may not be used to form free ends. Instead, one or more end portions, e.g., two end portions, of the U-shaped wires may remain free to form free ends for later electrical connection, such that only a single type of U-shaped wire, without any additional straight wires or other types of wires, may be used to form or manufacture a concentrated motor winding configuration.

Although FIGS. 5A and 5B illustrate a particular size, shape, configuration, or arrangement of portions of an example concentrated motor winding configuration, other example embodiments may include other sizes, shapes, configurations, or arrangements of portions of the example concentrated motor winding configuration. For example, the wires may have different sizes, shapes, or cross-sectional shapes, a different number of wires may be included, and/or various other modifications may be made to portions of the example concentrated motor winding configuration.

Figure 6:
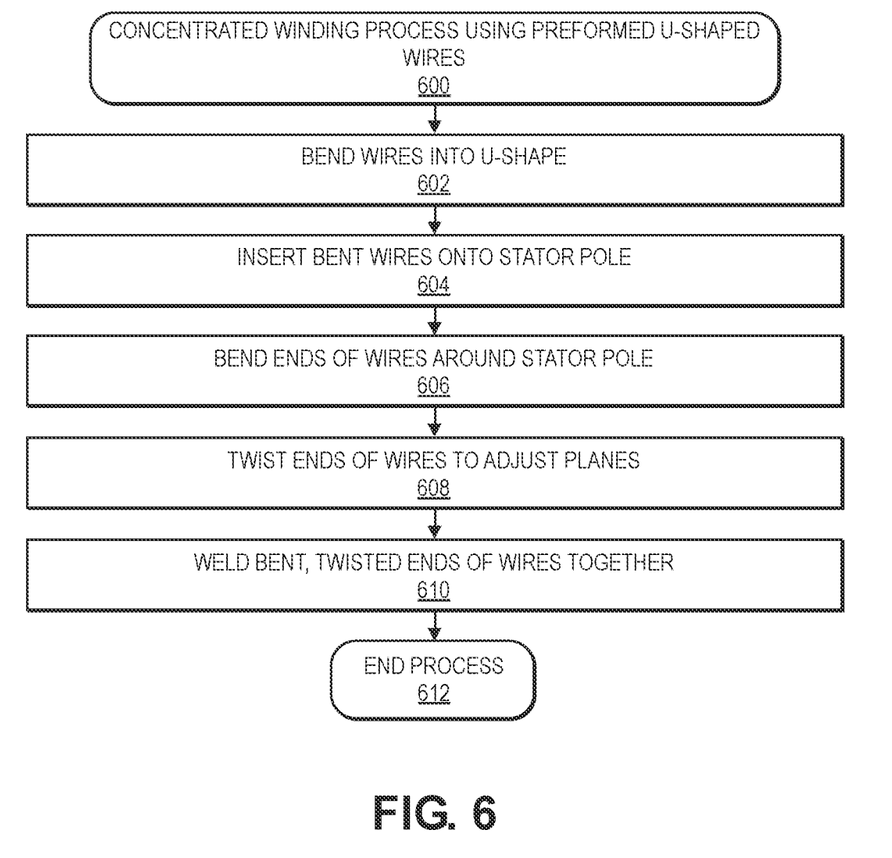
FIG. 6 is a flow diagram illustrating an example concentrated winding process using preformed U-shaped wires, in accordance with implementations of the present disclosure.

FIG. 6 is a flow diagram illustrating an example concentrated winding process using preformed U-shaped wires 600, in accordance with implementations of the present disclosure.

The process 600 may begin by bending wires into a U-shape, as at 602. For example, the wires may be bent into a U-shape including a substantially straight central portion, and two substantially straight end portions that extend from respective ends of the substantially straight central portion. The wires may comprise a first U-shape with a first defined length of the substantially straight central portion, and a second defined length of the two substantially straight end portions. In addition, the wires may comprise a second U-shape with a first defined length of the substantially straight central portion, a second defined length of one of the two substantially straight end portions, and a third defined length of another of the two substantially straight end portions. In example embodiments, the third defined length may be longer than the second defined length. Moreover, the wires may be bent into a U-shape using automated, robotic, and/or manual forming processes, tools, equipment, or machinery. Further, a control system may instruct bending of wires into a U-shape.

The process 600 may continue by inserting the bent wires onto a stator pole, as at 604. For example, a plurality of wires having a U-shape may be stacked and inserted together onto a stator pole, e.g., inserted laterally onto a stator pole and radially toward a stator pole axis of the stator pole. In some example embodiments, the plurality of wires may include both wires having the first U-shape and wires having the second U-shape, e.g., a stack of a plurality of wires having the first U-shape, a wire having the second U-shape on a bottom of the stack, and a wire having the second U-shape on a top of the stack. Moreover, the wires may be stacked and inserted onto the stator pole using automated, robotic, and/or manual insertion processes, tools, equipment, or machinery. Further, a control system may instruct inserting of bent wires onto a stator pole.

The process 600 may proceed by bending ends of the wires around the stator pole, as at 606. For example, respective ends of the stacked wires that have been inserted onto the stator pole may be bent around the stator pole to meet or contact each other. In some example embodiments, some respective ends of portions of the wires having the second U-shape may not be bent, e.g., to form later electrical connections for an electric machine. Moreover, respective ends of the wires may be bent around the stator pole using automated, robotic, and/or manual forming processes, tools, equipment, or machinery. Further, a control system may instruct bending of respective ends of the wires around the stator pole.

The process 600 may continue to twist ends of the wires to adjust planes, as at 608. For example, respective ends of the stacked wires that have been bent around the stator pole may also be formed to include a twist, such that a respective end of one wire that is positioned generally at a first plane along the stator pole axis may meet or contact a respective end of an adjacent wire of the stack of wires that is positioned generally at a second, adjacent plane along the stator pole axis. The respective ends of the stacked wires may be formed to include substantially similar twists, e.g., to meet or contact respective ends of adjacent wires of the stack of wires. Moreover, respective ends of the wires may be formed to include twists using automated, robotic, and/or manual forming processes, tools, equipment, or machinery. Further, a control system may instruct twisting of respective ends of the wires to adjust planes.

The process 600 may proceed to weld the bent, twisted ends of the wires together, as at 610. For example, respective pairs of respective ends of the stacked wires that have been bent around the stator pole and that have been twisted to adjust planes along the stator pole axis may be welded together to form a concentrated motor winding configuration. By welding the bent, twisted ends of the wires together, the stacked wires around the stator pole may form a substantially continuous concentrated winding that wraps around the stator pole, e.g., from one free end to an opposite free end of the winding. Moreover, respective ends of the wires may be welded together using automated, robotic, and/or manual welding processes, tools, equipment, or machinery. Further, a control system may instruct welding of respective bent, twisted ends of the wires together.

The process 600 may then end, as at 612.

Figure 7:
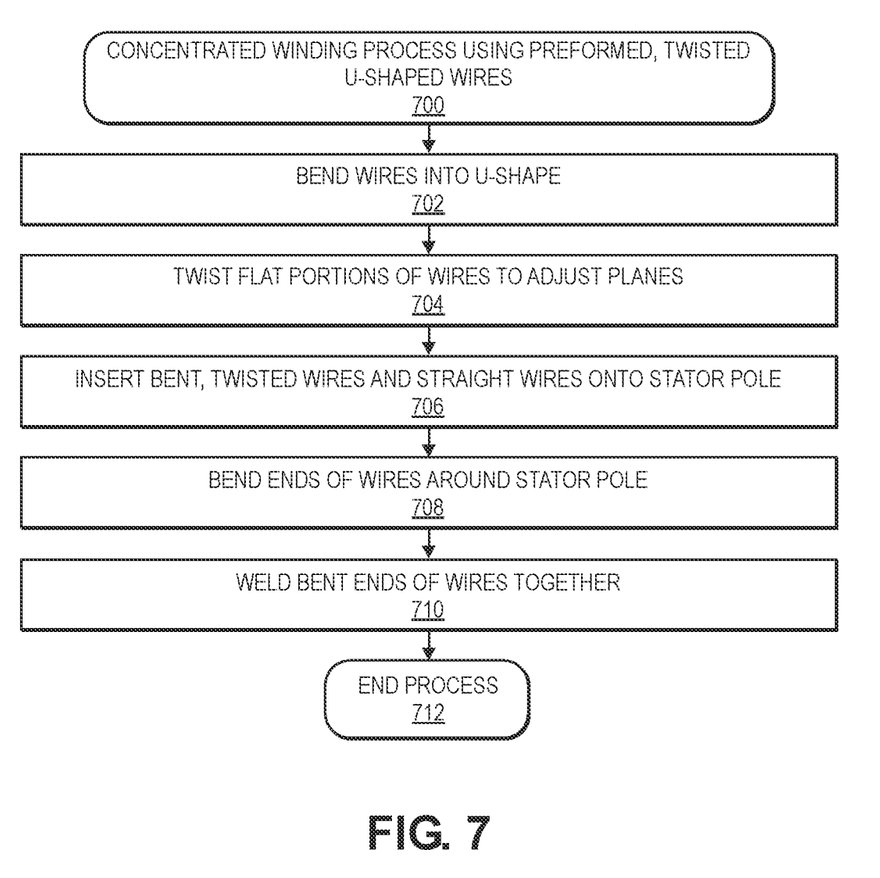
FIG. 7 is a flow diagram illustrating an example concentrated winding process using preformed, twisted U-shaped wires, in accordance with implementations of the present disclosure.

FIG. 7 is a flow diagram illustrating an example concentrated winding process using preformed, twisted U-shaped wires 700, in accordance with implementations of the present disclosure.

The process 700 may begin by bending wires into a U-shape, as at 702. For example, the wires may be bent into a U-shape including a substantially straight central portion, and two substantially straight end portions that extend from respective ends of the substantially straight central portion. The wires may comprise a first U-shape with a first defined length of the substantially straight central portion, and a second defined length of the two substantially straight end portions. Moreover, the wires may be bent into a U-shape using automated, robotic, and/or manual forming processes, tools, equipment, or machinery. Further, a control system may instruct bending of wires into a U-shape.

The process 700 may continue by twisting flat portions of the wires to adjust planes, as at 704. For example, the substantially straight central portion of the U-shape of the wires may be formed to include a twist, such that one of the two substantially straight end portions is positioned or aligned along a first plane or level along a stator pole axis, and another of the two substantially straight end portions is positioned or aligned along a second plane or level along a stator pole axis. In example embodiments, the first and second planes or levels may be adjacent each other along the stator pole axis. Moreover, the substantially straight central portion of the wires may be formed to include twists using automated, robotic, and/or manual forming processes, tools, equipment, or machinery. Further, a control system may instruct twisting of flat portions of the wires to adjust planes.

The process 700 may proceed by inserting the bent, twisted wires and straight wires onto a stator pole, as at 706. For example, a plurality of bent, twisted wires having a U-shape may be stacked and inserted together onto a stator pole, e.g., inserted laterally onto a stator pole and radially toward a stator pole axis of the stator pole. In some example embodiments, the plurality of wires may include both wires having the first U-shape and substantially straight wires, e.g., a stack of a plurality of wires having the first U-shape, a straight wire on a bottom of the stack, and a straight wire on a top of the stack. In addition, respective ends of portions of the straight wires may form later electrical connections for an electric machine. Moreover, the wires may be stacked and inserted onto the stator pole using automated, robotic, and/or manual insertion processes, tools, equipment, or machinery. Further, a control system may instruct inserting of bent, twisted wires and straight wires onto a stator pole.

The process 700 may continue to bend ends of the wires around the stator pole, as at 708. For example, respective ends of the stacked wires that have been inserted onto the stator pole may be bent around the stator pole to meet or contact each other. Moreover, respective ends of the wires may be bent around the stator pole using automated, robotic, and/or manual forming processes, tools, equipment, or machinery. Further, a control system may instruct bending of respective ends of the wires around the stator pole.

The process 700 may proceed to weld the bent ends of the wires together, as at 710. For example, respective pairs of respective ends of the stacked wires that have been bent around the stator pole may be welded together to form a concentrated motor winding configuration. By welding the bent ends of the wires together, the stacked wires around the stator pole may form a substantially continuous concentrated winding that wraps around the stator pole, e.g., from one free end to an opposite free end of the winding. Moreover, respective ends of the wires may be welded together using automated, robotic, and/or manual welding processes, tools, equipment, or machinery. Further, a control system may instruct welding of respective bent ends of the wires together.

The process 700 may then end, as at 712.

Figure 8:
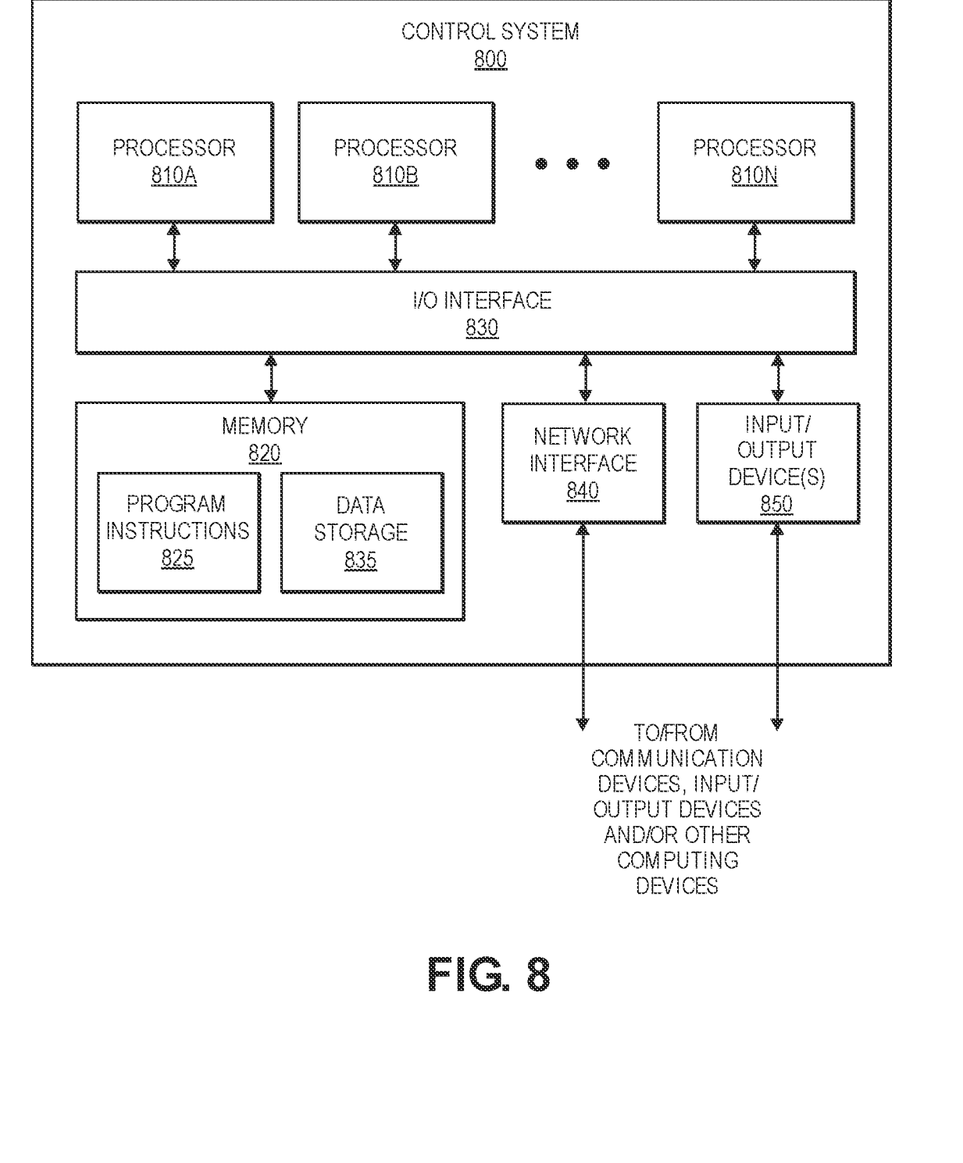
FIG. 8 is a block diagram illustrating various components of an example control system, in accordance with implementations of the present disclosure.

FIG. 8 is a block diagram illustrating various components of an example control system 800, in accordance with implementations of the present disclosure.

Various operations of a control system or controller, such as those described herein, may be executed on one or more computer systems, and/or interacting with various other computers, systems, or devices in a manufacturing facility, according to various implementations. For example, the control system or controller discussed above may function and operate on one or more computer systems. One such control system is illustrated by the block diagram in FIG. 8. In the illustrated implementation, a control system 800 includes one or more processors 810A, 810B through 810N, coupled to a non-transitory computer-readable storage medium 820 via an input/output (I/O) interface 830. The control system 800 further includes a network interface 840 coupled to the I/O interface 830, and one or more input/output devices 850. In some implementations, it is contemplated that a described implementation may be implemented using a single instance of the control system 800 while, in other implementations, multiple such systems or multiple nodes making up the control system 800 may be configured to host different portions or instances of the described implementations. For example, in one implementation, some data sources or services (e.g., related to portions of concentrated motor winding configuration systems, operations, or processes, etc.) may be implemented via one or more nodes of the control system 800 that are distinct from those nodes implementing other data sources or services (e.g., related to other portions of concentrated motor winding configuration systems, operations, or processes, etc.).

In various implementations, the control system 800 may be a uniprocessor system including one processor 810A, or a multiprocessor system including several processors 810A-810N (e.g., two, four, eight, or another suitable number). The processors 810A-810N may be any suitable processor capable of executing instructions. For example, in various implementations, the processors 810A-810N may be general-purpose or embedded processors implementing any of a variety of instruction set architectures (ISAs), such as the x86, PowerPC, SPARC, or MIPS ISAs, or any other suitable ISA. In multiprocessor systems, each of the processors 810A-810N may commonly, but not necessarily, implement the same ISA.

The non-transitory computer-readable storage medium 820 may be configured to store executable instructions and/or data accessible by the one or more processors 810A-810N. In various implementations, the non-transitory computer-readable storage medium 820 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 820 as program instructions 825 and data storage 835, respectively. In other implementations, program instructions and/or data may be received, sent or stored upon different types of computer-accessible media, such as non-transitory media, or on similar media separate from the non-transitory computer-readable storage medium 820 or the control system 800. Generally speaking, a non-transitory, computer-readable storage medium may include storage media or memory media such as magnetic or optical media, e.g., disk or CD/DVD-ROM, coupled to the control system 800 via the I/O interface 830. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processors 810A-810N, the non-transitory computer-readable storage medium 820, and any peripheral devices, including the network interface 840 or other peripheral interfaces, such as input/output devices 850. In some implementations, the I/O interface 830 may perform any necessary protocol, timing or other data transformations to convert data signals from one component (e.g., non-transitory computer-readable storage medium 820) into a format suitable for use by another component (e.g., processors 810A-810N). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer-readable storage medium 820, may be incorporated directly into the processors 810A-810N.

The network interface 840 may be configured to allow data to be exchanged between the control system 800 and other devices attached to a network, such as other control systems, manufacturing system controllers, automated or robotic system, machinery, or equipment, other computer systems, various types of sensors, various types of vision systems, imaging devices, or imaging sensors, or between nodes of the control system 800. In various implementations, the network interface 840 may support communication via wired or wireless general data networks, such as any suitable type of Ethernet network.

Input/output devices 850 may, in some implementations, include one or more displays, screens, monitors, projection devices, other visual input/output devices, speakers, microphones, other audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 800. Multiple input/output devices 850 may be present in the control system 800 or may be distributed on various nodes of the control system 800. In some implementations, similar input/output devices 850 may be separate from the control system 800 and may interact with one or more nodes of the control system 800 through a wired or wireless connection, such as over the network interface 840.

As shown in FIG. 8, the memory 820 may include program instructions 825 that may be configured to implement one or more of the described implementations and/or provide data storage 835, which may comprise various tables, data stores and/or other data structures accessible by the program instructions 825. The program instructions 825 may include various executable instructions, programs, or applications to facilitate concentrated motor winding configuration operations and processes described herein, such as automated or robotic wire forming apparatus, machine, or equipment controllers, drivers, or applications, automated or robotic wire insertion apparatus, machine, or equipment controllers, drivers, or applications, automated or robotic wire welding apparatus, machine, or equipment controllers, drivers, or applications, sensor controllers, drivers, or applications, sensor data processing applications, vision system or imaging device controllers, drivers, or applications, imaging data processing applications, other manufacturing equipment controllers, drivers, or applications, etc. The data storage 835 may include various data stores for maintaining data related to systems, operations, or processes described herein, such as wires, wire sizes, shapes, lengths, dimensions, or other attributes, U-shapes and associated attributes, stators, stator teeth or poles, pole axes, pole shoes, electric machines or motors and attributes thereof, sensors, sensor data, vision systems or imaging devices, imaging data, manufacturing apparatus, machinery, or equipment, etc.

Those skilled in the art will appreciate that the control system 800 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 800 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6 and 7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method to form a concentrated motor winding, comprising:
    bending a plurality of wires into a U-shape, the U-shape including a substantially straight central portion and two substantially straight end portions, respective ones of the two substantially straight end portions extending from respective ends of the substantially straight central portion, wherein each of the plurality of wires has a same U-shape and a same length;
    forming a twist along the substantially straight central portion of individual wires of the plurality of wires;
    subsequent to bending the plurality of wires into the U-shape, inserting the plurality of wires laterally onto a stator pole from only a same side of the stator pole, wherein no wires are inserted laterally from an opposite side of the stator pole;
    inserting two straight wires at opposite sides of the plurality of wires along the stator pole, the opposite sides including a top of a stack of the plurality of wires closer to a first end of the stator pole and a bottom of the stack of the plurality of wires closer to a second opposite end of the stator pole;
    bending respective ends of the substantially straight end portions of the plurality of wires and respective ends of the two straight wires around the stator pole;
    welding respective pairs of the respective ends of the substantially straight end portions of the plurality of wires and the respective ends of the two straight wires that are bent around the stator pole; and
    wherein the concentrated motor winding provides a winding density greater than or equal to 70%.

2. The method of claim 1, wherein the U-shape further includes a first defined length associated with the substantially straight central portion, and a second defined length associated with the two substantially straight end portions.

3. The method of claim 1, wherein the plurality of wires are bent into the U-shape using an automated or robotic wire former.

4. The method of claim 1, wherein the plurality of wires are formed with the twist using a compression die.

5. The method of claim 1, wherein the plurality of wires and the two straight wires are inserted laterally onto the stator pole substantially simultaneously using an insertion tool.

6. A method to form a motor winding, comprising:
    bending a plurality of first wires into a first U-shape, wherein each of the plurality of first wires has the first U-shape and a same length;
    subsequent to bending the plurality of first wires into the first U-shape, inserting the plurality of first wires laterally onto a stator pole from only a same side of the stator pole;
    inserting two second wires at opposite sides of the plurality of first wires along the stator pole, the opposite sides including a top of the plurality of first wires closer to a first end of the stator pole and a bottom of the plurality of first wires closer to a second opposite end of the stator pole;
    bending respective ends of the plurality of first wires and respective ends of the two second wires around the stator pole;
    welding respective pairs of the respective ends of the plurality of first wires and the respective ends of the two second wires that are bent around the stator pole; and
    wherein the motor winding provides a winding density greater than or equal to 70%.

7. The method of claim 6, wherein the first U-shape includes a substantially straight first central portion and two substantially straight first end portions, respective ones of the two substantially straight first end portions extending from respective ends of the substantially straight first central portion.

8. The method of claim 7, wherein the first U-shape further includes a first defined length associated with the substantially straight first central portion, and a second defined length associated with the two substantially straight first end portions.

9. The method of claim 6, wherein the plurality of first wires and the two second wires include a substantially square or rectangular cross-sectional shape.

10. The method of claim 6, further comprising:
    forming a twist along the substantially straight central portion of the plurality of first wires.

11. The method of claim 10, wherein the two second wires include substantially straight wires having a same length.

12. The method of claim 6, wherein the two second wires include a second U-shape, the second U-shape including a substantially straight second central portion and two substantially straight second end portions, respective ones of the two substantially straight second end portions extending from respective ends of the substantially straight second central portion.

13. The method of claim 12, wherein the second U-shape further includes a first defined length associated with the substantially straight second central portion, a second defined length associated with one of the two substantially straight second end portions, and a third defined length associated with another of the two substantially straight second end portions; and
    wherein the second and third defined lengths are different from each other.

14. The method of claim 12, further comprising:
    forming a twist along respective pairs of the respective ends of the plurality of first wires and the respective ends of the two substantially straight second end portions of the two second wires that are bent around the stator pole.

15. The method of claim 6, wherein the plurality of first wires and the two second wires are inserted substantially laterally onto the stator pole.

16. A concentrated motor winding configuration, comprising:
    a plurality of first wires having a first U-shape, the first U-shape including a substantially straight first central portion and two substantially straight first end portions, respective ones of the two substantially straight first end portions extending from respective ends of the substantially straight first central portion, wherein each of the plurality of first wires has the first U-shape and a same length; and
    two second wires having a second shape;
    wherein the plurality of first wires and the two second wires are inserted laterally onto a stator pole from only a same side of the stator pole, the two second wires being on opposite sides of the plurality of first wires along the stator pole, the opposite sides including a top of the plurality of first wires closer to a first end of the stator pole and a bottom of the plurality of first wires closer to a second opposite end of the stator pole;

wherein respective pairs of respective ends of the plurality of first wires and respective ends of the two second wires are bent and welded around the stator pole; and wherein the concentrated motor winding configuration having a winding density greater than or equal to 70%.

17. The concentrated motor winding configuration of claim 16, wherein the first U-shape further includes a first defined length associated with the substantially straight first central portion, and a second defined length associated with the two substantially straight first end portions.

18. The concentrated motor winding configuration of claim 16, wherein the plurality of first wires includes a twist formed along the substantially straight first central portion; and wherein the two second wires include substantially straight wires having a same length.

19. The concentrated motor winding configuration of claim 16, wherein the second shape of the two second wires includes a second U-shape including a substantially straight second central portion and two substantially straight second end portions, respective ones of the two substantially straight second end portions extending from respective ends of the substantially straight second central portion;

wherein the second U-shape further includes a first defined length associated with the substantially straight second central portion, a second defined length associated with one of the two substantially straight second end portions, and a third defined length associated with another of the two substantially straight second end portions; and wherein respective pairs of respective ends of the plurality of first wires and respective ends of the two second wires are further twisted around the stator pole.

20. The concentrated motor winding configuration of claim 16, wherein the stator pole is associated with at least one of a radial flux electric machine, an axial flux electric machine, or a transverse flux electric machine.

* * * * *